US011097525B1

(12) United States Patent
Dhau et al.

(10) Patent No.: US 11,097,525 B1
(45) Date of Patent: Aug. 24, 2021

(54) FILTER MEDIA AND SYSTEM AND METHOD FOR MANUFACTURE THEREOF

(71) Applicant: Molekule, Inc., San Francisco, CA (US)

(72) Inventors: Jaspreet S. Dhau, San Francisco, CA (US); Avtar Singh, San Francisco, CA (US); David Goslin, San Francisco, CA (US)

(73) Assignee: Molekule, Inc., San Francisco, CA (US)

( * ) Notice: Subject to any disclaimer, the term of this patent is extended or adjusted under 35 U.S.C. 154(b) by 0 days.

(21) Appl. No.: 17/166,931

(22) Filed: Feb. 3, 2021

Related U.S. Application Data

(60) Provisional application No. 62/989,443, filed on Mar. 13, 2020, provisional application No. 62/969,566, filed on Feb. 3, 2020.

(51) Int. Cl.
*B32B 37/12* (2006.01)
*B01D 53/00* (2006.01)
*B01D 53/32* (2006.01)
*B32B 37/14* (2006.01)

(52) U.S. Cl.
CPC ........ *B32B 37/1284* (2013.01); *B01D 53/007* (2013.01); *B01D 53/323* (2013.01); *B32B 37/144* (2013.01); *B01D 2255/802* (2013.01); *B32B 2037/1253* (2013.01); *B32B 2250/02* (2013.01); *B32B 2307/202* (2013.01)

(58) Field of Classification Search
CPC ..................................................... B32B 37/12
See application file for complete search history.

(56) References Cited

U.S. PATENT DOCUMENTS

| 2,311,272 | A | 2/1943 | Ware |
|---|---|---|---|
| 4,065,276 | A | 12/1977 | Nakaya et al. |
| 4,896,590 | A | 1/1990 | Groos |
| 4,931,654 | A | 6/1990 | Horng |
| D328,946 | S | 8/1992 | Havrilla |
| 5,240,479 | A | 8/1993 | Bachinski |
| D360,635 | S | 7/1995 | Mark |
| D362,441 | S | 9/1995 | Mark |
| 5,453,049 | A | 9/1995 | Tillman et al. |
| 5,505,904 | A | 4/1996 | Haidinger et al. |
| 5,620,669 | A | 4/1997 | Plinke et al. |

(Continued)

FOREIGN PATENT DOCUMENTS

| JP | 2001025668 A | 1/2001 |
|---|---|---|
| JP | 2002291856 A | 10/2002 |

(Continued)

OTHER PUBLICATIONS

Evans, Hugh. Adhesives: Understanding adhesives for filter fabrication. Apr. 26, 2012. https://www.filtsep.com/filter%20media/features/adhesives-understanding-adhesives-for-filter/ (Year: 2012).*

(Continued)

*Primary Examiner* — Daniel H Lee
(74) *Attorney, Agent, or Firm* — Jeffrey Schox; Diana Lin (57) ABSTRACT

A system and method for laminating filter media can include applying an adhesive to a layer of the filter media and curing the adhesive. A multilayer filter assembly can include a first and a second layer laminated together using an inorganic adhesive.

9 Claims, 7 Drawing Sheets

(56) References Cited

U.S. PATENT DOCUMENTS

| | | | |
|---|---|---|---|
| 5,709,735 A | 1/1998 | Midkiff et al. |
| 5,790,934 A | 8/1998 | Say et al. |
| D400,663 S | 11/1998 | Furlough |
| 5,873,920 A | 2/1999 | Wong et al. |
| 5,922,093 A | 7/1999 | James et al. |
| 6,372,694 B1 | 4/2002 | Osinga et al. |
| 6,531,100 B1 | 3/2003 | Ogata et al. |
| 6,607,702 B1 | 8/2003 | Kang et al. |
| D493,874 S | 8/2004 | Woods |
| D505,999 S | 6/2005 | Song |
| 7,063,820 B2 | 6/2006 | Goswami |
| D552,724 S | 10/2007 | Chen |
| 7,371,351 B2 | 5/2008 | Goswami |
| D611,579 S | 3/2010 | Zlotnik et al. |
| D648,429 S | 11/2011 | Choi et al. |
| D652,408 S | 1/2012 | Chen |
| D687,017 S | 7/2013 | Ashcraft et al. |
| D697,496 S | 1/2014 | Ashcraft et al. |
| 8,658,046 B2 | 2/2014 | Barry et al. |
| D710,329 S | 8/2014 | Holzer |
| D716,427 S | 10/2014 | Lim et al. |
| D717,420 S | 11/2014 | Von Seggern |
| 8,951,376 B2 | 2/2015 | Rasmussen |
| D744,541 S | 12/2015 | Langhammer et al. |
| D752,732 S | 3/2016 | Ansley et al. |
| D754,832 S | 4/2016 | Seo et al. |
| D766,213 S | 9/2016 | Hinokio |
| D768,844 S | 10/2016 | Koseoglu et al. |
| D773,704 S | 12/2016 | Pardo et al. |
| D774,020 S | 12/2016 | Hinokio |
| D796,019 S | 8/2017 | Thompson |
| D802,022 S | 11/2017 | Yao et al. |
| D803,369 S | 11/2017 | Kim et al. |
| D803,810 S | 11/2017 | Lee et al. |
| D804,002 S | 11/2017 | Huang |
| D805,622 S | 12/2017 | Lee |
| D806,843 S | 1/2018 | Mcdonnell |
| D807,327 S | 1/2018 | Xiong |
| D808,927 S | 1/2018 | Schaal et al. |
| D810,049 S | 2/2018 | Lee et al. |
| D810,135 S | 2/2018 | Langhammer et al. |
| D810,137 S | 2/2018 | Tsang et al. |
| D810,265 S | 2/2018 | Chen |
| D810,266 S | 2/2018 | Li |
| D818,097 S | 5/2018 | Cho et al. |
| D828,912 S | 9/2018 | Powell et al. |
| D829,312 S | 9/2018 | Riering-Czekalla et al. |
| D829,313 S | 9/2018 | Cho et al. |
| D829,314 S | 9/2018 | Cho et al. |
| D831,810 S | 10/2018 | Cho et al. |
| D831,811 S | 10/2018 | Cho et al. |
| D832,414 S | 10/2018 | Sharma et al. |
| D834,694 S | 11/2018 | Walter et al. |
| 10,137,216 B2 | 11/2018 | Goswami et al. |
| D835,766 S | 12/2018 | Chen |
| D836,760 S | 12/2018 | Fredäng et al. |
| 10,183,187 B2 | 1/2019 | Li |
| D850,596 S | 6/2019 | Wu |
| D865,149 S | 10/2019 | Lin |
| D865,932 S | 11/2019 | Ha et al. |
| D870,870 S | 12/2019 | Copparstad et al. |
| D879,276 S | 3/2020 | King |
| D884,138 S | 5/2020 | Chen |
| D884,860 S | 5/2020 | Zhang |
| D886,268 S | 6/2020 | Montagnino et al. |
| D886,272 S | 6/2020 | Yang et al. |
| 2002/0160913 A1 | 10/2002 | Sangiovanni et al. |
| 2003/0180200 A1 | 9/2003 | Reisfeld |
| 2004/0013583 A1 | 1/2004 | Burkhardt |
| 2004/0166037 A1 | 8/2004 | Youdell et al. |
| 2005/0061656 A1 | 3/2005 | Benoit et al. |
| 2005/0138905 A1 | 6/2005 | Kubokawa |
| 2006/0124442 A1 | 6/2006 | Valpey et al. |
| 2006/0150818 A1 | 7/2006 | Okamoto et al. |
| 2007/0199288 A1 | 8/2007 | Paterson et al. |
| 2007/0296035 A1 | 12/2007 | George et al. |
| 2008/0112845 A1 | 5/2008 | Dunn et al. |
| 2009/0002985 A1 | 1/2009 | Peck et al. |
| 2009/0175757 A1 | 7/2009 | Yao et al. |
| 2009/0229478 A1 | 9/2009 | Wu |
| 2009/0245594 A1 | 10/2009 | Abramovich et al. |
| 2010/0101413 A1 | 4/2010 | Jones et al. |
| 2010/0143205 A1 | 6/2010 | Engelhard |
| 2010/0196223 A1 | 8/2010 | Hay et al. |
| 2010/0260644 A1 | 10/2010 | Day et al. |
| 2011/0088375 A1 | 4/2011 | Suzuki et al. |
| 2011/0101712 A1 | 5/2011 | Laconte |
| 2011/0117002 A1 | 5/2011 | Dardas et al. |
| 2011/0203238 A1 | 8/2011 | Witter et al. |
| 2012/0161405 A1 | 6/2012 | Mohn et al. |
| 2012/0183443 A1 | 7/2012 | Hurley |
| 2012/0273340 A1 | 11/2012 | Felix |
| 2013/0036908 A1 | 2/2013 | Jones et al. |
| 2014/0131923 A1 | 5/2014 | Festner et al. |
| 2014/0290489 A1 | 10/2014 | Uemura et al. |
| 2015/0008014 A1 | 1/2015 | Zhou et al. |
| 2015/0320900 A1 | 11/2015 | Goswami et al. |
| 2016/0367916 A1 | 12/2016 | Koehler |
| 2017/0043044 A1 | 2/2017 | Sobhy |
| 2017/0106218 A1 | 4/2017 | Lin et al. |
| 2017/0122605 A1 | 5/2017 | Lee et al. |
| 2017/0321717 A1 | 11/2017 | Park et al. |
| 2018/0027809 A1 | 2/2018 | Chiattello et al. |
| 2018/0117511 A1 | 5/2018 | Yamauchi et al. |
| 2020/0109869 A1 | 4/2020 | Mäkipää et al. |

FOREIGN PATENT DOCUMENTS

| | | | |
|---|---|---|---|
| JP | 2007190533 A | 8/2007 |
| JP | 2017148484 A | 8/2017 |
| WO | 2004078320 A1 | 9/2004 |
| WO | 2015098386 A1 | 7/2015 |

OTHER PUBLICATIONS

"Molekule Air Purifier found online—[Feb. 22, 2018]—https://molekule.com/?utm_source=google_search_search&utm_medium=rt&utm_campaign=brand&utm_term=term=molekule&utm_content=bmm_2&gclid=EAaIQobChMI5ufdtbK62QIViYjICh3d8gvEAYAASAAEgJcdPD_BwE".

International Search Report and Written Opinion for PCT Application No. PCT/US18/56061 dated Jan. 4, 2019.

International Search Report and Written Opinion for PCT Application No. PCT/US2019/043804 dated Dec. 2, 2019.

Molekule website screen grabs from Wayback Machine Internet Archive. Jun. 10, 2016 (Year: 2016).

"Molekule Website Screen Capture from Jun. 10, 2016 by Wayback Machine, (Year: 2016)".

"Water-Based Adhesives—Information and Overview", https://www.hotmelt.com/blogs/blog/water-based-adhesives-information-and-overview.

Curtis, Gannon L., et al., "Reduction of Total and Viable Air Particles in the OR Setting by using Ultraviolet In-room Air Disinfection and Recirculation Units", American Association of Hip and Knee Surgeons, Cleveland Clinic, Nov. 4, 2017.

Evans, Hugh , "Adhesives: Understanding adhesives for filter fabrication", Filter Media Apr. 26, 2012, https://www.filtsep.com/filter%20media/features/adhesives-understanding-adhesives-for-filter/.

Hou, Wenbo , et al., A review of surface plasmon resonance-enhanced photocatalysis, Advanced 4, 15 Functional Materials 23.13 (Apr. 5, 2013): 1612-1619. p. 1 col. 2 para 1, p. 2 col. 1 para 2.

Merrill, Reynold C., et al., "Chemistry of the soluble silicates", J. Chem. Educ. 1947, 24, 6, 262, Jun. 1, 1947, https://pubs.acs.org/doi/pdf/10.1021/ed024p262.

Ochiai, Tsuyoshi , et al., Photoelectrochemical properties of TiO2 photocatalyst and its applications for environmental purification, (56) References Cited

OTHER PUBLICATIONS

Journal of Photochemistry and Photobiology C: Photochemistry reviews 13.4 (Dec. 1, 2012): 247-262.
InternationalSearch Report and Written Opinion for application No. PCT/US21/16464 dated Jul. 1, 2021.

* cited by examiner

FILTER MEDIA AND SYSTEM AND METHOD FOR MANUFACTURE THEREOF

CROSS-REFERENCE TO RELATED APPLICATIONS

This application claims the benefit of U.S. Provisional Application No. 62/969,566, filed 3 Feb. 2020 and U.S. Provisional Application No. 62/989,443 filed 13 Mar. 2020, each of which is incorporated in its entirety by this reference.

TECHNICAL FIELD

This invention relates generally to the filter lamination field, and more specifically to a new and useful system and method in the filter lamination field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
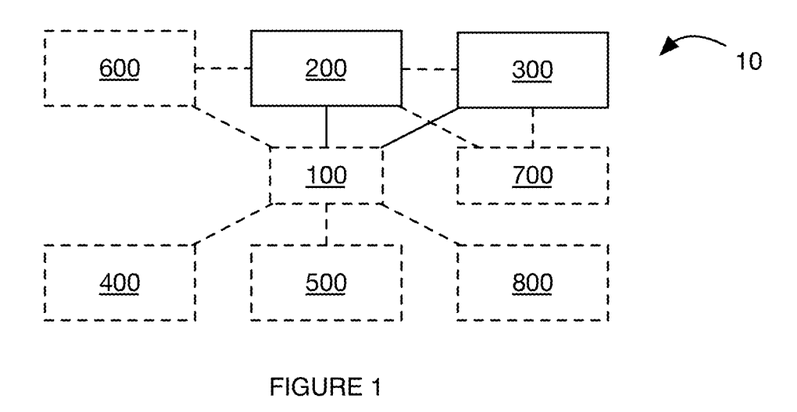
FIG. 1 is a schematic representation of the system.

As shown in FIG. 1, a filter lamination apparatus 10 can include one or more: adhesive appliers 200 and curing mechanisms 300. The lamination machine can optionally include one or more: conveyor systems 600, sensors 700, treatment mechanisms 500, shaping mechanisms 400, collectors 800, and/or any suitable components.

Figure 2:
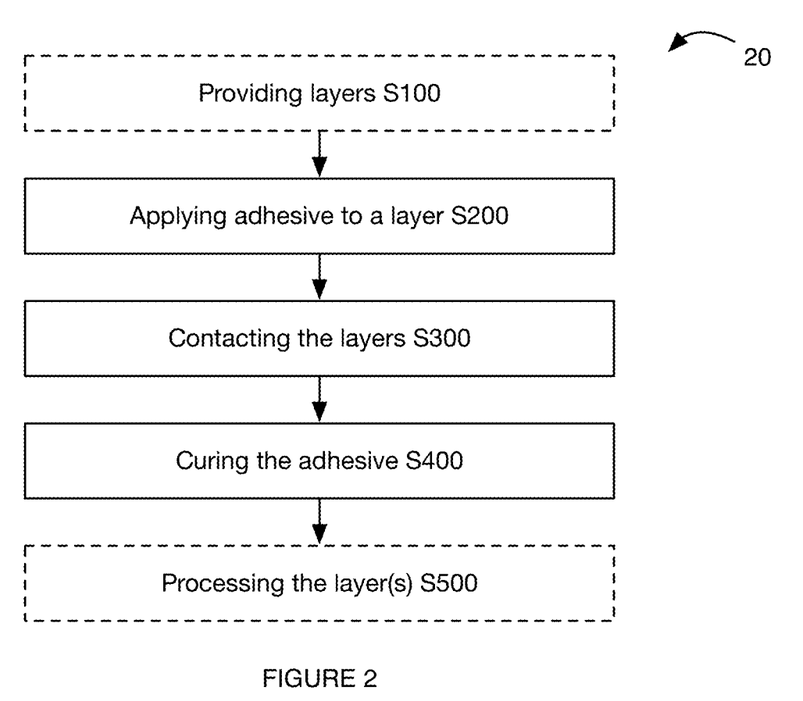
FIG. 2 is a schematic representation of the method.

As shown in FIG. 2, a lamination method 20 can include: applying adhesive to a layer S200, contacting the layers S300, and curing the adhesive. The lamination method can optionally include providing the layers S100, processing the layer S500 (e.g., washing the layer, shaping the layer, etc.) and/or any suitable steps.

The machine and method preferably function to couple (e.g., bond, secure, hold together, etc.) two or more layers. In a specific example, each of the layers can be a layer 130 of a layered (e.g., multi-layered) filter 100 (e.g., air filter, water filter, oil filter, etc.). However, the system and/or method can be used to couple any suitable articles. The layers can be porous, fibrous, woven, holey, solid, meshed, and/or have any suitable structure. Each layer can be made of cloth, foam, fiberglass, paper, metal (e.g., aluminium, stainless steel, etc.), polymers, fabric, glass (e.g., low melt glass), filter media (e.g., previously manufactured filter media, etc.), and/or any suitable materials. Each layer can include a single layer, or include multiple sub-layers (e.g., be multilayer filter media). The layer(s) can be coated (e.g., with a light-reactive composition, with nanoparticles, with photocatalytic materials, etc.) or uncoated. The layers can be electrically conductive or electrically nonconductive. Layers that are being coupled can be made of the same or different materials. In examples, the layers can be overlapping (e.g., coupled a face from a first layer to a face of a second layer), adjoining one another (e.g., couple an edge from one layer to an edge of a second layer, couple an edge of one layer to a face of the second layer, etc.), adjacent one another and/or arranged in any suitable manner. Each layer is preferably coupled to adjacent layers using the same adhesive. However, one or more layers can be coupled to adjacent layers using different adhesives (e.g., an inorganic adhesive, an organic adhesive, etc.), be melted together, be coupled without using adhesive, and/or otherwise be coupled to adjacent (or nonadjacent) layers. Examples of the layers include: filter material (e.g., air filters; oil filters; water filters; HVAC filters; HEPA filters; PECO filters; sorption filters such as carbon filters; anti-biologic filters; electrostatic filters; etc.), metal mesh, and/or any other suitable material. Examples of filters and/or layers that can be used include those disclosed in U.S. Pat. No. 7,635,450 filed 22 Dec. 2009, U.S. Pat. No. 7,371,351 filed 26 Apr. 2006, U.S. Pat. No. 7,063,820 filed 16 Jun. 2003, U.S. Pat. No. 9,889,221 filed 10 Oct. 2014, Ser. No. 16/165,975 filed 19 Oct. 2018, Ser. No. 16/777,454 filed 30 Jan. 2020, and/or Ser. No. 16/523,928 filed 26 Jul. 2019, each of which is incorporated in its entirety by this reference. However, any other suitable filter can be used.

Figure 3A:
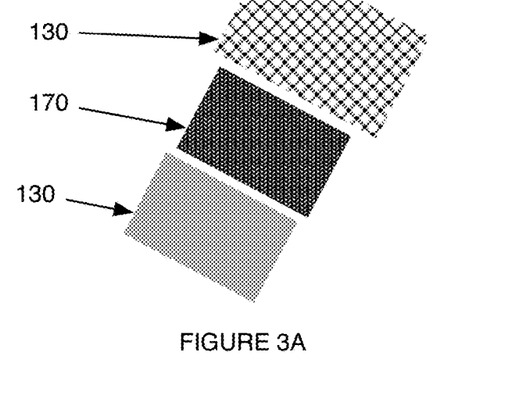
FIGS. 3A and 3B are exploded views of examples of layered filters where the layers are coupled using adhesive.
Figure 3B:
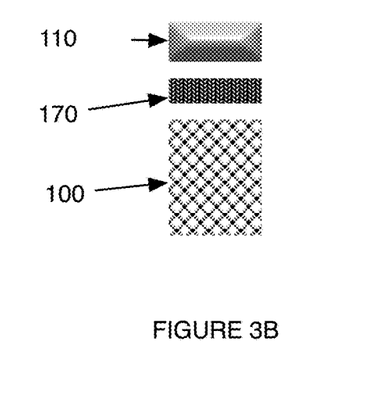

In a first illustrative example as shown in FIG. 3A, the system and/or method can be used to laminate two (or more) filter layers 130 between the respective filter layer broad faces. In a second illustrative example, as shown in FIG. 3B, the system and/or method can be used to laminate a filter (and/or filter layer) and a support cap 110. In a third illustrative example, the system and/or method creates a multi-layer, inorganic adhesive-laminated filter (e.g., using a cold or room temperature adhesive application process, not using a hot melt lamination process, using a lamination process with less than a threshold proportion of outgassed VOCs, etc.). However, the system and/or method can be used to retain any suitable layers and/or materials.

In variants, the machine and/or method can laminate layers at a rate between 0.1 and 100 m/min (such as 1 ft/min, 10 ft/min, 15 ft/min, 20 ft/min, 50 ft/min, 100 ft/min, 150 ft/min, 200 ft/min, 300 ft/min, etc.). However, the machine and/or method can process layers at any suitable rate.

2. Benefits

Variations of the technology can confer several benefits and/or advantages.

First, variants of the technology can minimize outgassing (e.g., meet or exceed ASTM E95 standard; have a total mass loss of 1% or less at room temperature; etc.). Minimized outgassing can minimize the amount of VOCs generated during manufacture, the amount of VOCs adsorbed into the filter media, the amount of VOCs outgassed post-manufacture, the amount of VOCs outgassed and/or generated during filter operation, and/or otherwise minimize outgassing. In specific examples, the use of inorganic adhesive and/or the use of adhesive that is water soluble can minimize the amount of outgassing.

Second, variants of the technology can be performed at low temperatures (e.g., <50° C., <60° C., <75° C., <90° C., 95° C., <00° C., <200° C., etc.). In specific examples, the use of aqueous adhesive mixtures can enable the adhesive to be applied at low temperature, and the water can be removed from the adhesive by heating the adhesive to approximately 100° C.

Third, variants of the technology can slow and/or avoid degradation of the coupling between layers. In specific examples, this can be enabled by using of radical resistant and/or UV resistant adhesives such as inorganic adhesives.

Fourth, variants of the technology can reduce the build-up of solvents (e.g., moisture) within a lamination apparatus. Reducing the build-up of solvents can reduce the curing time for the adhesive and can help mitigate the risk of electrical shorting of electronics within the machine (e.g., the curing mechanism, control system, treatment system, shaping mechanism, sensors, etc.). In specific examples, reducing the build-up of solvents can be enabled or improved by using perforated transfer plates for the curing mechanism.

However, variants of the technology can confer any other suitable benefits and/or advantages.

3. Filter Lamination Apparatus

The optional conveyor system 600 functions to provide one or more layers, to bring the layer(s) into contact, and to transport the layer(s) to other components of the apparatus. The layers (e.g., filter layers) can be provided to the conveyor system in a continuous sheet (e.g., cut to a target dimension along one or more edges, such as along the edge perpendicular to the direction of travel along the conveyor system, parallel to the direction of travel of along the conveyor system, etc.; oversized relative to final layer size; etc.) and/or in discrete sheets (e.g., cut to target layer size, oversized relative to final layer size, etc.). The layers can be automatically loaded on the conveyor system (e.g., from a manufacturing system, by a loading system, etc.) and/or manually loaded on the conveyor system. In some variants, output filter media from the lamination apparatus can be provided to the input of the lamination apparatus, for instance to add additional layers to the filter media.

The conveyor systems can be driven (e.g., motive force provided by, operated by, etc.) by one or more of: a motor, gravity, pneumatic pressure, vacuum, robot, manually, and/or can be driven in any suitable manner. In a series of examples, the conveyor system can include rollers 650, belts, chains, tracks, paddles, transfer plates (e.g., perforated transfer plates, linked transfer plates, unlinked transfer plates, etc.) and/or any suitable support mechanism(s) for transporting the layers (e.g., between different stages or mechanisms of the apparatus).

The conveyor system preferably maintains an approximately constant tension on the layers. However, the conveyor system can provide a variable tension (e.g., tension varies in a controlled manner, in a random manner, in a predetermined manner, etc.) and/or any suitable tension. The tension is preferably the same for each layer (both before and after layers are contacted), but can be different for different layers (e.g., before or after layers are contacted). The tension is preferably at most a threshold tension value. However, the tension can exceed the threshold tension (e.g., to operate the apparatus quicker, in situations when a predetermined amount of tearing the layers or filter media is acceptable or beneficial, etc.). The threshold tension can depend on the layer material, the apparatus speed, the adhesive, the adhesive curing time, the curing mechanism(s), the layer type, and/or any suitable properties.

The lamination apparatus preferably includes a conveyor system (e.g., a dual conveyor system) for each layer (e.g., 2 conveyor systems for coupling 2 layers). However, there can one or more conveyor systems for each component (e.g., an adhesive applier conveyor system, a curing conveyor system, a treatment conveyor system, a collector conveyor system, a shaping conveyor system, etc.), and/or any suitable number of conveyor systems (e.g., 1, 2, 3, 4, 10, etc.).

The adhesive applier 200 preferably functions to apply adhesive 170 to one or more layers 130 (e.g., one or more broad faces, edges, surfaces, points, etc. of the layers). The adhesive applier is preferably arranged before (e.g., upstream of) the curing mechanism. However, the adhesive applier can be collocated with and/or arranged after the curing mechanism. The apparatus preferably includes one fewer adhesive applier than number of layers to be coupled. In an illustrative example, to couple two layers, the machine can have one adhesive applier; to couple three layers, the machine can have two adhesive appliers; to couple four layers, the machine can have three adhesive appliers, and so on. However, the apparatus can include a single adhesive applier (e.g., configured to apply adhesive to more than one layer, configured to apply adhesive to more than one broad face, surface, or side of a layer, etc.), an adhesive applier for each type (e.g., composition) of adhesive to be applied, and/or any suitable number of adhesive appliers. The adhesive appliers can include one or more of: rollers (e.g., where the roller is coated with adhesive and the layer comes into contact with the roller), paint brush, liquid stream (e.g., curtain coating the layer with adhesive), stamp, spray mechanism (e.g., to spray coat the layer), reservoir (e.g., for dip-coating), extruder, a spin coating mechanism, a drop casting mechanism, and/or any suitable adhesive applier can be used. The adhesive applier can include a reservoir 250, a tank, a container, sponge, and/or any suitable vessel for containing adhesive. However, the adhesive applier can be coupled to a manifold (e.g., where the manifold is coupled to a source of adhesive) and/or can receive adhesive in any suitable manner.

The adhesive applier can optionally include an adhesive remover which functions to ensure that a predetermined amount of adhesive is applied to the surface (broad face) of the layer by removing excess adhesive. The adhesive remover is preferably a doctor blade assembly 270, where a distance between the blade and the layer controls the amount of adhesive on the layer. However, the adhesive remover can additionally or alternatively include any suitable mechanism for controlling an adhesive thickness.

The adhesive 170 preferably functions to retain (e.g., generate a retention force between) two or more layers together. The adhesive is preferably essentially inorganic (e.g., does not include any hydrocarbons; <1 ppt, <1 ppb, <1 ppm, <0.001%, <0.01%, <0.1%, <1%, etc. by weight, by mass, by stoichiometry, by concentration etc. organic content; etc.). However, the adhesive can include organic compounds (e.g., polymers, hydrocarbons, etc. such as a predetermined concentration of organic content) and/or be essentially organic. The adhesive is preferably water soluble (e.g., water solubility >10 g/100 ml, >100 g/100 ml, etc.), but can be weakly soluble in water (e.g., solubility in water between 0.1 g/100 ml and 10 g/100 ml), insoluble in water (e.g., water solubility <0.1 g/100 ml; soluble in organic solvent; etc.), soluble in an inorganic nonaqueous solvent (e.g., ammonia, sulfur dioxide, etc.), and/or have any suitable solubility.

The adhesive is preferably prepared as a solution, but can be prepared as a slurry, paste, colloid, solid, mixture, and/or in any suitable state or mixture. The solution is preferably an aqueous solution. However, the solvent of the solution can additionally or alternatively include any suitable inorganic nonaqueous solvent (e.g., liquid ammonia), organic solvent (e.g., alcohols, ethers, esters, etc.), and/or any suitable solvent.

The adhesive can be: dried, cured, sintered, reacted, or otherwise bonded to the layer(s). The drying time can be any suitable amount of time and/or range thereof between 1 sec and 1 hour such as 1 min. However, any drying time can be used. The resultant adhesive thickness (e.g., after application, after bonding) is preferably a thickness and/or range thereof between 1 nm and 1 μm such as 100 nm; however, any suitable adhesive thickness can be used.

In an illustrative example, the adhesive can be cured (e.g., set) by evaporating at least a predetermined portion (e.g., 10%, 20%, 30%, 50%, 60%, 80%, 90%, 95%, 99%, values therebetween, etc.) of the solvent from the adhesive solution or mixture.

The adhesive is preferably radical compatible (e.g., rate of reaction of the adhesive with a radical to reach equilibrium and/or completion is greater than 1 day, 1 week, 1 month, 1 year, 10 years, etc.; yield from reactions with radicals is low such as $10^{-3}$, $10^{-4}$, $10^{-6}$, $10^{-8}$, $10^{-10}$, etc.; does not react with radicals; etc.). However, the adhesive can be weakly radical compatible (e.g., rate of reaction less than 1 day), can react with radicals (e.g., without producing byproducts, without producing volatile byproducts, without changing physical/chemical properties of the adhesive, producing byproducts, changing the properties of the adhesive, etc.), and/or can have any suitable radical reactivity. Examples of radicals can include: alkyl radicals, hydrogen radicals, ozone radicals, superoxide radicals, oxygen radicals, hydroxyl radicals, and/or any suitable radical.

In variants, such as when a filter (and/or filter layer) includes a photocatalytic material (e.g., a photoelectrochemical oxidizing (PECO) material), the adhesive is preferably resistant to ultraviolet (UV) radiation (e.g., does not absorb UV radiation, does not undergo reactions in the presence of UV radiation, does not undergo reactions with chemicals produced by illumination of air with UV radiation, reaction time for the adhesive in UV illumination is >1 day, >1 week, >1 month, >1 year, >10 years, etc.; etc.). However, additionally or alternatively, the adhesive can be resistant to UV radiation of a given intensity, can be resistant to UV radiation of a given wavelength (e.g., UVa such as 100-280 nm, UVb such as 280-315 nm, UVc such as 315-400 nm, 100-400 nm and/or any subset thereof, etc.), UV resistant based on the environmental conditions (e.g., UV resistant when the humidity is <10%, <20%, <30%, <40%, <50%, <80%, <90%, <95%, <99%, etc.; UV resistant when the environment lacks and/or has a below threshold amount of specific reactive species such as water, ozone, oxygen, etc.; etc.), and/or can be reactive to UV radiation.

The adhesive is preferably stable at least between temperatures of about 0° C. to about 40° C., but can be stable over a larger range of temperatures (e.g., stable to temperatures below about 0° C., stable to temperatures above about 40° C., etc.), stable over a smaller temperature range (e.g., 15-35° C., 20-25° C., etc.), have poor thermal stability, and/or have any suitable thermal stability.

In some variants, particularly but not exclusively for use with photoelectrochemical (e.g., PECO) or electrostatic filters and/or layers, the adhesive can be electrically conductive (e.g., have an electrical conductivity meeting or exceeding a threshold electrical conductivity, have a resistance less than or equal to a threshold electrical resistance), which can function to electrically couple (e.g., provide a pathway for electrons and/or holes to pass between) two or more layers in contact across the adhesive. However, the adhesive can additionally or alternatively be electrically insulating (e.g., have an electrical conductivity less than or equal to a threshold electrical conductivity, have a resistance greater than or equal to a threshold electrical resistance), semiconducting, and/or have any suitable electrical conductivity.

The adhesive preferably includes a glass-forming compound. The glass-forming compound can include: silicon-based such as sodium silicate (e.g., $Na_{2x}Si_yO_{2y+x}$), lithium silicate (e.g., $Li_{2x}Si_yO_{2y+x}$), potassium silicate (e.g., $K_{2x}Si_yO_{2y+x}$), rubidium silicate (e.g., $Rb_{2x}Si_yO_{2y+x}$), cesium silicate (e.g., $Cs_{2x}Si_yO_{2y+x}$), ammonium silicate (e.g., $(NH_4)_{2x}Si_yO_{2y+x}$), quaternary ammonium silicates (e.g., $(NR_4)_{2x}Si_yO_{2y+x}$, wherein R can be any suitable alkyl, benzyl, aryl, aromatic, etc.), amine silicates, sodium orthosilicate, lithium orthosilicate, potassium orthosilicate, rubidium orthosilicate, cesium orthosilicate, ammonium orthosilicate, quaternary ammonium orthosilicates, amine orthosilicates, sodium metasilicate, lithium metasilicate, potassium metasilicate, rubidium metasilicate, cesium metasilicate, ammonium metasilicate, quaternary ammonium metasilicates, amine metasilicates, sodium pyrosilicate, lithium pyrosilicate, potassium pyrosilicate, rubidium pyrosilicate, cesium pyrosilicate, ammonium pyrosilicate, quaternary ammonium pyrosilicates, amine pyrosilicates, combinations thereof, and/or any suitable silicate. However, any suitable glass and/or ceramic forming compound can be used. For example, the adhesive can include any suitable compound referred to as "liquid glass." However, the adhesive can be an inorganic ceramic adhesive or have any other suitable chemical composition.

The adhesive preferably includes about 1-50% glass-forming compound (e.g., by mass, by volume, by concentration, etc.). However, the adhesive can include any suitable amount of glass-forming compound.

The adhesive preferably includes one or more additives. The additives can function to modify the rheology of the adhesive (e.g., the viscosity), the drying time of the adhesive, the adhesive thickness (e.g., the amount of adhesive applied and/or needed to couple two layers), the reactivity of the adhesive (e.g., to UV radiation, to radicals, to reactive species, etc.), control film formation on the adhesive reservoir surface, and/or modify any suitable properties of the adhesive. The additives are preferably homogeneously mixed with glass-forming compound (e.g., in solution, in colloid, in slurry, in solid, etc.). However, the additives can be conjugated to the glass-forming compounds, added separately from silicon compounds, heterogeneously mixed, and/or provided in any suitable manner.

In variants of the apparatus and/or filter media that couple or include more than two layers, each of the layers can be coupled using the same type of adhesive, different adhesives, different retention mechanisms, the same retention mechanisms, and/or any suitable retention mechanism(s) can be used.

The curing mechanism 300 preferably functions to treat the adhesive and/or layers so that the adhesive couples (e.g., generates the retention force) the layers together. The curing mechanism can cure a volume, an area, a line, and/or a point of adhesive on the layers. The curing mechanism is preferably adjacent (e.g., next to, proximal, after) to the adhesive applier, but the curing mechanism can be coincident with the adhesive applier and/or arranged in any suitable position. The conveyor system preferably passes through the curing mechanism. The conveyor system can be moving through the curing mechanism (e.g., allowing the adhesive to cure as the layer is drawn through the curing mechanism), can be stopped (e.g., stopping the layer) inside the curing mechanism, the curing mechanism can include a fixed platform (e.g., that the conveyor mechanism deposits the layer onto), and/or any suitable support mechanism can be included with the curing mechanism. The curing mechanism can treat the adhesive mechanically (e.g., by applying pressure and/or force such as by applying a force in a direction normal to the contacting surfaces of the layers), thermally, radiatively (e.g., UV radiation, visible radiation, infrared radiation, gamma rays, x-rays, microwaves, etc.), chemically (e.g., adding binders, adding curing agents, desiccating the adhesive, etc.), and/or using any suitable treatment. The curing mechanism is preferably arranged upstream of the shaping mechanism (e.g., the adhesive is preferably cured before shaping the filter media), but can additionally or alternatively be arranged downstream of the shaping mechanism (e.g., cure a shaped assembly).

In a specific example, the curing mechanism can treat the adhesive to remove solvent from the applied adhesive. In a second specific example, the curing mechanism can induce a phase transition in the adhesive (e.g., melting, evaporating, subliming, condensation, freezing, deposition, etc.) to enable the adhesive to couple the layers. However, the curing mechanism can otherwise modify the adhesive (and/or layers) to cure the adhesive.

The curing mechanism can cure all or a portion (e.g., 1%, 5%, 10%, 20%, 30%, 50%, 70%, 80%, 90%, 95%, 99%, etc.; an amount that generates a target retention force; a predetermined quantity; etc.) of the adhesive joining layers.

The temperature of the curing mechanism is preferably at most the boiling point of the adhesive (e.g., approximately the boiling point of the adhesive solvent), but can be any suitable temperature. In a specific example, the temperature of the curing mechanism can be any suitable value and/or range thereof between 50-95° C. (such as 50-60° C.), but the temperature can be any suitable temperature. In these examples, having the temperature near or below the boiling point of the solvent can decrease the potential for bubble formation and/or layer separation resulting from the boiling of the adhesive.

Figure 9A:
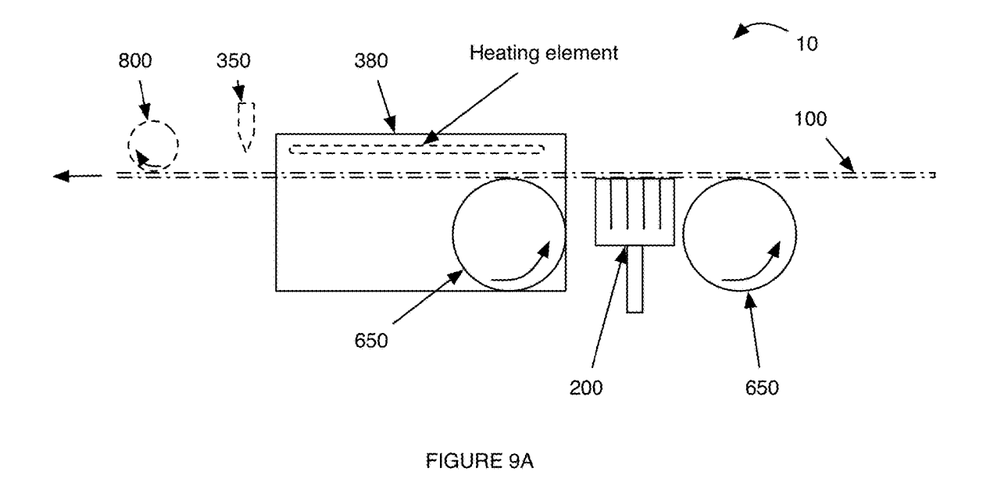
FIGS. 9A and 9B are schematic representations of examples of a lamination apparatus.

In a first variant, as shown in FIG. 9A, the curing mechanism can include a curing chamber 380 (e.g., an oven chamber). The size of the oven chamber can be determined based on the temperature (and/or target temperature) of the chamber, the pass-through speed of the machine (e.g., a longer chamber for faster pass-through), the number of curing mechanisms, and/or any suitable properties.

Figure 9B:
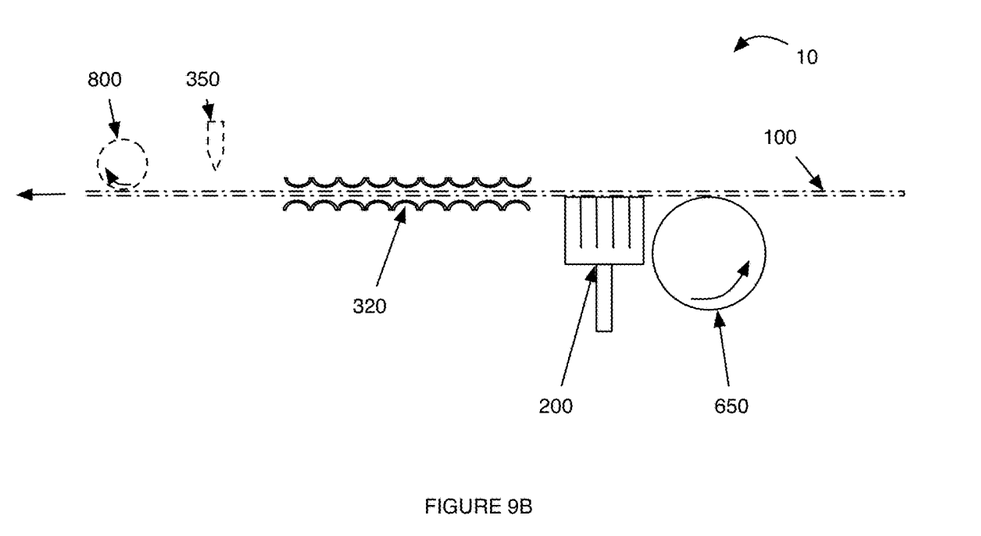
Figure 10A:
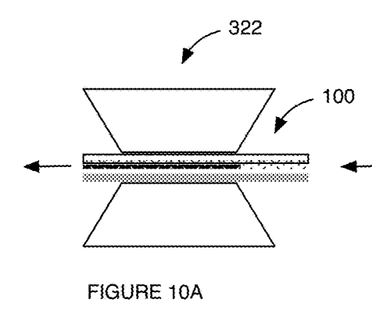
FIGS. 10A, 10B, and 10C are schematic representations of examples of a cross-sectional view of plates.
Figure 10B:
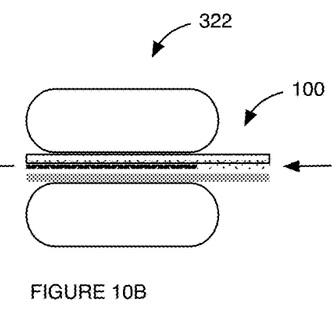
Figure 10C:
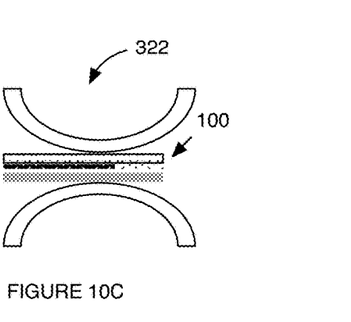
Figure 11A:
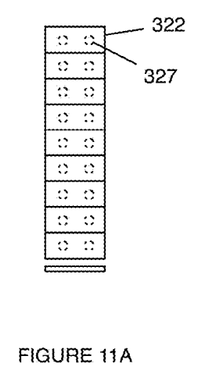
FIGS. 11A and 11B are schematic representations of a top view and a side view, respectively, of an example of a curing mechanism.
Figure 11B:
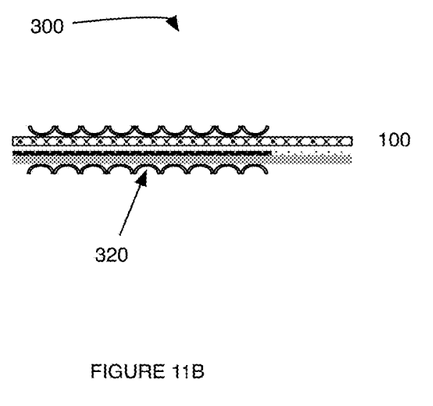

In a second variant, as shown in FIGS. 9B and 11B, the curing mechanism can include a set of plates 320. The plates 322 are preferably in contact with the layers (e.g., a broad face of the layers, an edge of the layers, etc.), but can be offset from the layers (e.g., by a predetermined distance) and/or otherwise arranged relative to the layers. The plates can be arranged above the filter media, below the filter media, can include a subset of plates above the filter media and a second subset of plates below the filter media, arranged so that a reference axis of the plates (e.g., a surface normal of the plates, a surface normal of an edge of the plates, of a center of the plates, lateral axis, longitudinal axis, etc.) is parallel to, intersects, and/or is perpendicular to a reference axis of the layer(s) (e.g., a surface normal of a broad face of the layers, a propagation direction of the layers, etc.), as shown for example in FIGS. 10A-10C, and/or the plates can be arranged in any suitable manner.

In the second variant, each of the plates is preferably maintained at a temperature between about 50-95° C. (e.g., 50° C., 55° C., 60° C., 65° C., 70° C., 75° C., 80° C., 85° C., 90° C., values or ranges therebetween), but each of the plates can be maintained at a temperature less than 50° C., greater than 95° C., and/or any suitable temperature. Each plate can be held at the same and/or different temperatures.

In the second variant, each of the plates is preferably perforated (e.g., defines one or more holes 327 in the surface of the plate, as shown for example in FIG. 11A, etc.). The perforation preferably functions to provide a path for adhesive and/or solvent to flow off of the plates thereby alleviating adhesive build up on the plates and facilitating curing of the adhesive between filter layers. The percentage of the plates that is solid can be between about 20% and 80% (e.g., 30%, 40%, 50%, 60%, 70%, 40-60%, values or ranges therebetween), but can be less than 20% solid or greater than 80% solid. The perforations can be circular, oval, elliptical, polygonal (e.g., rectangular, hexagonal, etc.), oblong, patterned (e.g., octagonal cane, airline, Marietta, Grecian, full leaf clover, etc.), as shown for example in FIGS. 13A-13E, and/or have any suitable shape. One or more plates can optionally include channels or grooves (e.g., to provide a preferred flow path for solvent or adhesive such as around the perimeter of the plate; extending along a reference axis of the plate such as a longitudinal axis, a lateral axis, a layer movement axis, etc.; etc.) that direct the solvent and/or adhesive to a reservoir or other suitable outlet. However, a subset of the plates can be perforated (e.g., where the remainder of the plates are solid or otherwise configured), the plates can be solid, the plates can be porous, and/or one or more plate can be otherwise configured.

The plates are preferably made of stainless steel, but can be made of any metal (e.g., aluminium), plastic, wood, porous material, ceramic, and/or any suitable material. The plates can be coated or uncoated. Examples of coatings can include a non-stick coating (e.g., polytetrafluoroethylene (FE) also known as Teflon®, ceramic coating, polymeric coating, etc.) which can function to prevent solvent and/or adhesive from sticking to the plates and facilitate plate cleaning. However, any coating can be used.

In a specific example of the second variant, the curing mechanism can include a first set of plates opposing a second set of plates across the filter media (e.g., across filter layers that are to be cured, across cured filter layers, etc.). The maximum and/or minimum separation distance between the two plates can be: a multiple of the desired assembly's thickness (e.g., 1×, 2×, 1.5×, etc.), smaller than the desired assembly's thickness, determined based on the uncompressed assembly's thickness, a target or predetermined force or pressure to be applied to the filter media, or otherwise determined. The two plates preferably cooperatively define a feed aperture configured to receive the layer(s) therebetween, but can otherwise interface with the layer(s). The feed aperture's lumen can be: flat, textured, include rollers, and/or include any other suitable feature. The plates preferably cooperatively apply a pressure (or force) to the layers (e.g., as the layers are fed between the plates). The heating and pressure are preferably applied simultaneously. However, heating can precede pressure, pressure can precede heating, heating and pressure can be provided iteratively with any suitable duration and ordering, and/or the layer can be heated and pressed in any suitable manner.

Figure 12A:
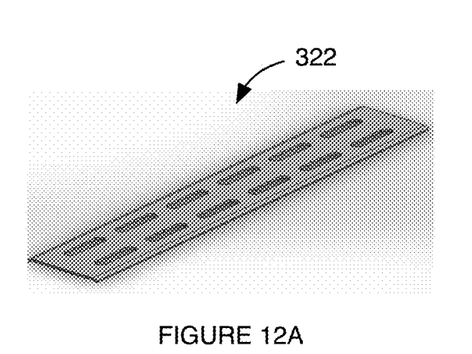
FIGS. 12A and 12B are isometric views of exemplary perforated plates.
Figure 12B:
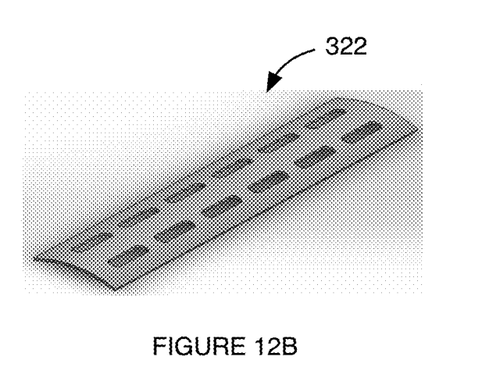
Figure 13A:
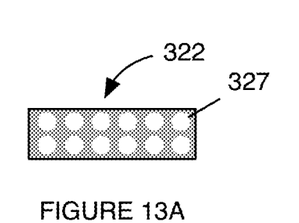
FIGS. 13A-13E are top down views of exemplary perforated plates.
Figure 13B:
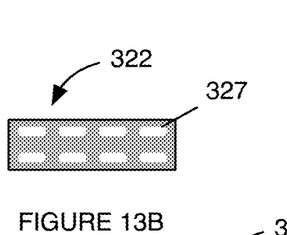
Figure 13C:
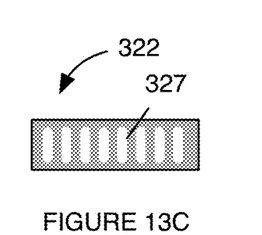
Figure 13D:
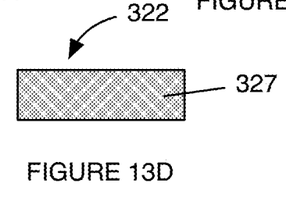
Figure 13E:
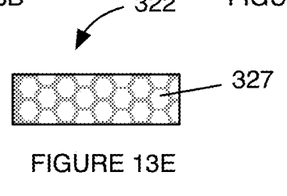

In a first variation of this specific example as shown in FIG. 12B, the plates can be convex, where an apex of each plate is preferably in contact with the filter media therebetween the first and second set of plates. However, additionally or alternatively, a surface of the plate, an edge of the plate, and/or any suitable portion of the plate(s) can contact the filter media. However, the plates can be concave, serpentine, cylindrical, spherical, and/or have any suitable curvature.

In a second variation of this specific example as shown in FIG. 12A, the plates can be trapezoidal. However, the plates can have any suitable planar and angles portions (e.g., barn-shaped).

In a third variation of this specific example, the plates can be planar, where a surface normal of the first set of plates is non-parallel (e.g., a normal vector from a broad face of the first plate can be arranged at an angle such as 1°, 2°, 5°, 10°, 20°, 30°, 45°, etc. to the normal vector of the second plate) to a surface normal of the second set of plates. The angle between the plates can be chosen to minimize pinching of the layer. In this variation, the first set of plates are preferably internally parallel e.g., each plate of the first set of plates is parallel to one another, surface normal for each plate of the first set of plates is parallel, etc.) and the second set of plates are preferably internally parallel (e.g., each plate of the second set of plates is parallel to one another, surface normal for each plate of the second set of plates is parallel, etc.). However, the first and second set of plates can be parallel, a subset of plates in the first or second set of plates can be nonparallel, and/or the plates can be otherwise arranged.

Figure 7:
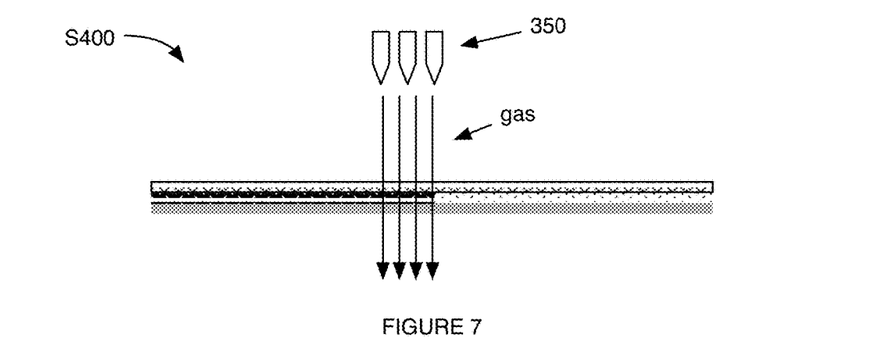
FIG. 7 is a schematic representation of an example of curing adhesive using a blower.

In a third variant of the curing mechanism, as shown in FIG. 7, the curing mechanism can include an air knife 350 (or blower) configured to blow air (e.g., compressed air, purified air, gas, dry air, low humidity air, etc.) toward (e.g., directed normal to a surface of, directed tangential to a surface of, directed to intersect a surface of, etc.) a layer (e.g., cured layer, partially cured layer, etc.). The air can have any suitable temperature between about 0° C. and 95° C. (e.g., 10° C., 20°, 30° C., 40° C., 50° C., 60° C., 70° C., 80° C., 90° C., 50-60° C., values or ranges therebetween), but the air can have a temperature less than 0° C., greater than 95° C., and/or any suitable temperature. The air can be blown in a line (e.g., parallel to a layer edge, perpendicular to a layer edge, random, arbitrary line, curved line, etc.), at a point (e.g., raster over the layer, follow a predetermined pattern over the layer, to treat a targeted spot of the layer, etc.), and/or over an area (e.g., over an area substantially equal to the layer area, to treat a target area of the layer, etc.).

However, the system can include any suitable curing mechanism(s).

The lamination apparatus can include one or more curing mechanisms. In variants that include a plurality of curing mechanisms, the curing mechanisms can be the same or different. Each curing mechanism can use the same or a different curing mechanism (e.g., combining two or more of the above variants) to treat the adhesive within filter media. The curing mechanisms are preferably arranged sequentially (e.g., the filter media is treated by a first curing mechanism followed by a second curing mechanism), but can be arranged coincidentally (e.g., at approximately the same position), the curing mechanisms can be separated by one or more apparatus (for example, a shaping mechanism can be arranged between a first and second curing mechanism), and/or the curing mechanisms can be otherwise arranged. Each curing mechanism preferably cures a portion (e.g., 1%, 5%, 10%, 20%, 30%, 40%, 50%, 60%, 70%, 75%, 80%, 90%, 95%, 99%, 100%, values therebetween, etc.) of the adhesive.

For example, a first curing mechanism can cure a first portion (e.g., fraction; proportion; quantity such as mass, volume, etc.; etc.) of the adhesive and a second curing mechanism can cure the remainder of the adhesive (e.g., portion of the adhesive that was not cured by the first curing mechanism. Similarly, a first curing mechanism can cure a first portion of the adhesive and a second curing mechanism can cure a second portion of the adhesive, where the second and first portions can be exclusive or inclusive of one another. The first and second portions are preferably substantially equal (e.g., approximately 50%), but can be unequal. The first and second portions preferably, but do not have to, amount to the entire adhesive between layers. However, each curing mechanism can cure any suitable portion of the adhesive.

The lamination machine can optionally include a protective mechanism. The protective mechanism functions to prevent and/or minimize deformation, snagging, and/or tearing of the layers. The protective mechanism can addition or alternatively function to apply the curing force (e.g., heat, pressure, etc.) to the agent (and/or adhesive) to promote curing the adhesive and protect the machine (and/or components of the machine) from solvent. The protective mechanism can be integrated with: the conveyor system, the curing mechanism (e.g., inside the curing mechanism, at the entrance of the curing mechanism, at the exit of the curing mechanism, outside the curing mechanism, etc.), the treatment mechanism, the shaping mechanism, the adhesive applier, and/or with any component. However, the protective mechanism can be separate from the other components (e.g., standalone). The protective mechanism preferably contacts the layer along a line, but can contact the layer at an area, a point, and/or a volume. The protective mechanism can include one or more plates (e.g., flat plates; curved plates such as convex plates, concave plates, serpentine plates; etc.), bars, rods, rollers, and/or any suitable structure. One or more edges (and/or vertex) of the protective mechanism can be straight, curved (e.g., convex, concave, serpentine, etc.), angled (e.g., toward the plate center, away from the plate center, etc.), and/or have any suitable structure. The protective mechanism can be solid, perforated (e.g., include one or more holes that can be arranged randomly, on a grid, etc. wherein the holes can be circular, rectangular, oblong, or have any suitable shape), porous, and/or any suitable structure.

The optional treatment mechanism 500 preferably functions to treat the layer (e.g., cured layer). Additionally or alternatively, the treatment mechanism can function to ensure that the layers are secured (e.g., that the adhesive has fully cured), that there is no excess adhesive, pretreat the filter (e.g., before curing), and/or the treatment mechanism can perform any suitable function. The treatment mechanism is preferably arranged after the curing mechanism, but can be arranged coincident with the curing mechanism and/or before the curing mechanism. The treatment mechanism is preferably arranged along the conveyor system. However, the treatment system can be separate from the conveyor system (e.g., where the layer is transported to the treatment system manually and/or automatically such as by a robot, a separate conveyor system, etc.). The treatment mechanism can include one or more washing mechanism (e.g., solvent such as water, methanol, ethanol, acetone, etc.; scrubbing mechanism such as brushes, foam handles, abrasives, etc.; surfactant(s); etc.), drying mechanism (e.g., air knife; dry air stream such as air with a moisture level below 10%, 5%, 1%, 0.1%, 0.01%, 0.002%, 0.001%, etc.; heated air stream such as air at 40° C., 50° C., 60° C., 70° C., 80° C., 90° C., 100° C., 200° C., etc.; heated plates; etc.), cleaning mechanism (e.g., electrostatic plates, duster, vacuum, compressed air, ultrasonication, etc.), and/or any suitable treatment mechanism. The treatment mechanism preferably treats the entire width of the filter media, but can additionally or alternatively treat a portion of the layer width. The length of the assembly concurrently treated by the treatment mechanism can be a static length, dynamically determined based on the assembly feed rate, and/or otherwise determined.

The optional shaping mechanism 400 functions to shape the layer (e.g., cured layer, uncured layer, treated layer, etc.). Each layer preferably includes the same shape and/or form factor, but one or more layer can have different shapes and/or form factors. Each layer can be planar (e.g., substantially two-dimensional such as rectangular), have a three dimensional structure (e.g., hemi-spherical, cylindrical, etc.), and/or have any suitable structure. Each layer can be pleated, planar, serpentine, convex, concave, combinations thereof, and/or have any suitable form factor.

The shaping mechanism is preferably arranged after the curing mechanism. However, the shaping mechanism can be before and/or coincident with the curing mechanism. The layer can be transported to the shaping mechanism manually and/or automatically (e.g., by a robot, by a conveyor system, etc.). In a specific example the conveyor system can pass through the shaping mechanism such that the layer is shaped while the layer is transported along the conveyor system. In a series of examples, the shaping mechanism can include one or more: cutting mechanism (e.g., functions to set the size of one or more dimensions of the filter such as blade, knife, scissors, laser, etc.), a mold, a mask, a press, a roller, a robot (e.g., robotic arm), and/or any suitable mechanism for shaping a filter can be used.

The optional collector 800 preferably functions to collect the filter media (e.g., treated layers, cured layers, shaped layers, etc.). The collector is preferably arranged after the curing mechanism but can be arranged before and/or coincident with the curing mechanism. The collector is preferably arranged after the shaping mechanism but can be arranged before and/or coincident with the shaping mechanism. The collector is preferably coupled to the conveyor system (e.g., the layer is preferably transferred to the collector by the conveyor system), but the collector can receive the layer manually, automatically, and/or in any suitable manner. The collector can include one or more: roller, bin, crate, pallet, and/or any suitable collector can be used.

The optional sensor(s) 700 can function to measure one or more properties of relating to the lamination apparatus and/or layer(s). One or more sensor can be coupled to the conveyor system, adhesive applier, curing mechanism, treatment mechanism, shaping mechanism, collector, external to the apparatus, one or more layer of the filter media, and/or can be arranged in any suitable manner. In specific examples, the sensor(s) can measure: volatile compound content (e.g., in the atmosphere, in the environment, retained by the filter, etc.), adhesion or retention forces (e.g., binding layers together), temperature, pressure, humidity, rate of operation, layer quality (e.g., detect presence of snags and/or tears in the filter), pressure drop across filter media, filter loading (e.g., with adhesive, with VOCs, etc.), adhesive thickness, filter efficiency (e.g., photocatalytic destruction efficiency, trapping efficiency, etc.), and/or any suitable quality. Examples of sensors can include: thermometers, hygrometer, scale, mass spectrometers, chemical indicators (e.g., moisture indicators), chromatographs, and/or any suitable sensor can be used.

4. Method

The method and/or any steps of the method can be performed manually (e.g., by a user) and/or automatically (e.g., by a robot, by a conveyor system, by one or more components of a machine, etc.). The method is preferably performed by a filter lamination apparatus as described above, but can be performed by any system. As shown in FIG. 2, a lamination method can include: applying adhesive to a layer, contacting the layers, and curing the adhesive. The lamination method can optionally include processing the layer (e.g., washing the layer, shaping the layer, etc.), providing the layers, and/or any suitable steps.

Providing the layers S100 functions to place the layers to be coupled in a lamination apparatus and/or in a condition (e.g., format, cleanliness, size, shape, location, etc.) to be coupled. Providing the layer preferably precedes applying adhesive to the layer, but can be performed at the same time as applying the adhesive. In a specific example, providing the layers can include loading each layer on the conveyor system(s), folding one or more layers, rolling one or more layers, and/or cleaning one or more layers. However, providing the layers can include any suitable steps.

Applying adhesive to a layer S200 functions to apply adhesive (such as an adhesive described above) to one or more layers. The adhesive can be applied to a one or both broad faces (e.g., sides) of the layer(s), to one or more edges of the layer(s), absorbed into the layer(s), applied to each layer to be adhered together, and/or to any other suitable surface. S200 is preferably performed by an adhesive applier, but can be performed by any component. S200 is preferably performed before contacting the layers, but can be performed at the same time and/or after contacting the layers. S200 preferably applies the adhesive as a solution (e.g., aqueous solution), but can apply the adhesive as a slurry, paste, colloid, solid, and/or in any suitable state of matter. S200 preferably applies the adhesive at a low temperature (e.g., at a temperature substantially equal to room temperature such as 20° C., 22° C., 25° C., 30° C., etc.; about or below the freezing point of the adhesive such as 0° C., −5° C., −10° C., etc.; any suitable temperature between about −20° C. to 40° C.; at a temperature less than or equal to 50° C., 60° C., 70° C., 80° C., 90° C., 100° C., etc.; etc.). However, S240 can apply the adhesive at a hot temperature (e.g., 30-200° C.), at a temperature below about −20° C., at a temperature above about 200° C., and/or at any suitable temperature. S200 can apply the adhesive to an edge, face, vertex, point, pattern of locations, and/or any suitable location(s) of a layer.

S200 can apply any thickness of adhesive between about 1 nm and 1 μm (such as 10 nm, 20 nm, 30 nm, 50 nm, 75 nm, 100 nm, 125 nm, 150 nm, 200 nm, 300 nm, 500 nm, 750 nm, etc.). However, the applied adhesive thickness can be less than 1 nm, greater than 1 μm, and/or any suitable thickness. S200 can apply the adhesive substantially uniformly (e.g., thickness of adhesive varies by less than about 1%, 2%, 5%, 10%, 20%, 25%, etc. over a broad face of the layer), in a pattern (e.g., crisscrossed; hatched; matching a material patterned on the layer such as a spatial pattern of photocatalytic material; the inverse of a material patterned on the layer such as applied to regions devoid of or having less than a threshold amount of photocatalytic material; have regions of adhesive and no adhesive; have varying thicknesses of adhesive; etc.), randomly, and/or in any suitable spatial distribution. In some variants, the adhesive can be patterned after it has been applied.

Figure 4:
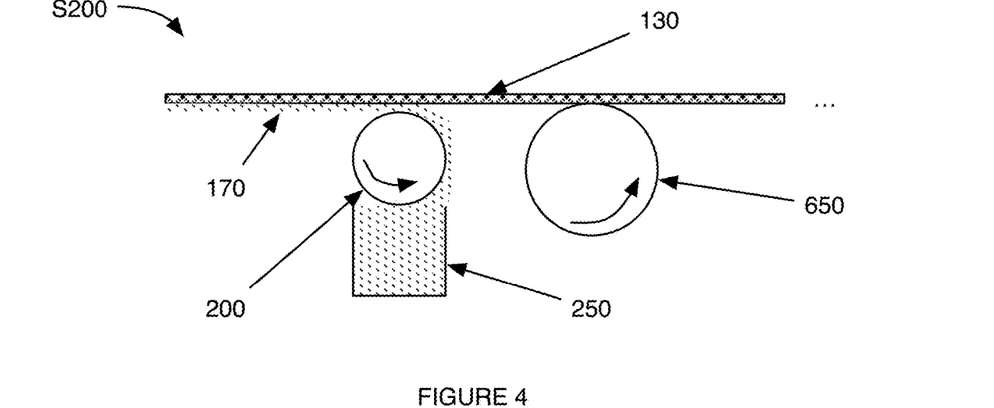
FIG. 4 is a schematic representation of an example of applying adhesive to a filter layer.

In examples, S200 can include screen-printing adhesive, rolling adhesive (for example as shown in FIG. 4), painting adhesive, dip-coating, curtain coating, spray coating, spin coating, stamping, and/or otherwise applying adhesive to the layer(s).

Figure 14:
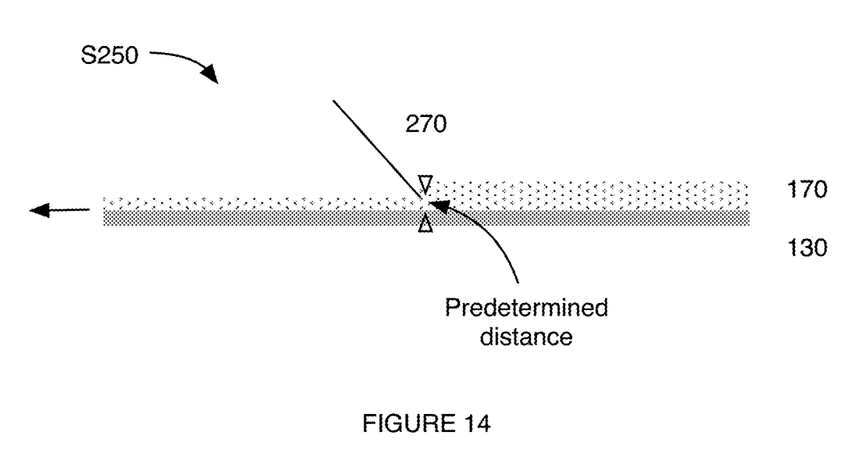
FIG. 14 is a schematic representation of an example of removing adhesive from a layer.

In variants, S200 can include removing adhesive from the layer S250, which can function to ensure that a target adhesive thickness is applied. Removing the adhesive can additionally or alternatively function to improve a uniformity of the adhesive on the layer, pattern the adhesive (e.g., by removing portions of the adhesive to generate the pattern), and/or can otherwise function. The adhesive can be removed using a doctor blade assembly, using a wash (e.g., a chemical wash), using a vacuum mechanism, using a squeegee, using gravity (e.g., allowing adhesive to drip or fall off the layer), a wick or other sorbent material to collect adhesive, and/or otherwise removing the adhesive. In an illustrative example as shown in FIG. 14, excess adhesive can be removed by a blade portion of a doctor blade assembly. In this example, the blade portion is positioned a predetermined distance from a broad face of the layer, where the predetermined distance is approximately equal to the target adhesive thickness. However, adhesive can otherwise be removed from the layers.

When adhesive is applied to two (or more) broad faces of a layer, S250 can include removing adhesive from one or both faces. For instance, two doctor blade assemblies can be used, where one doctor blade assembly removes adhesive from one broad face and the second doctor blade assembly removes adhesive from the second broad face. However, different adhesive removal mechanisms can be used, adhesive can be removed from a single broad face, and/or the adhesive can be removed in any suitable manner.

Figure 5:
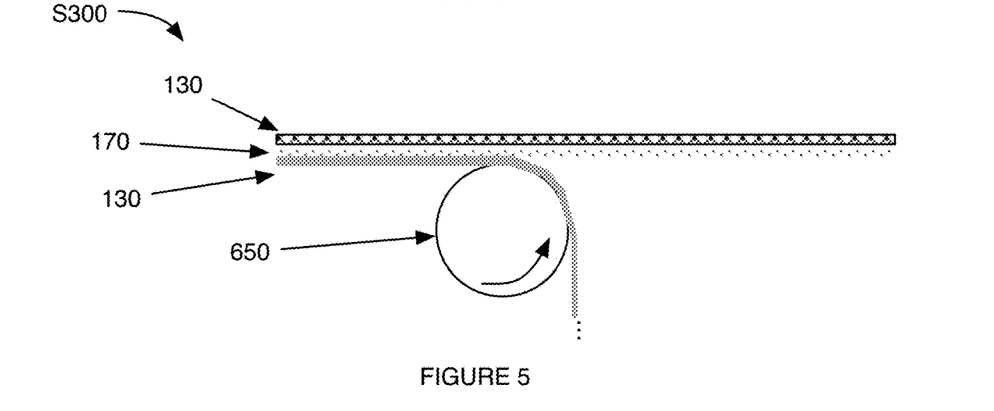
FIG. 5 is a schematic representation of an example of contacting two layers.

Contacting the layers S300 functions to bring two or more layers in contact. The layers can be brought in contact opposing the adhesive (e.g., the broad face of a first layer is in contact with the broad face of a second layer that has adhesive), adjacent to the adhesive (e.g., the edge of one layer is brought in contact with the edge of another layer that has adhesive), and/or in any suitable orientation. S300 is preferably performed before curing the adhesive, but can be performed at the same time as curing the adhesive. As shown for example in FIG. 5, S300 can be performed by the conveyor system (e.g., at locations of the conveyor system where two or more layers intersect) and/or by any suitable component. Any number of layers can be contacted at the same time. For example, two, three, four, five, ten, twenty layers or more can be contacted. Each layer is preferably maintained under substantially the same tension as they are contacted (e.g., to prevent, avoid, or decrease the risk of snagging, tearing, or otherwise perturbing the layers), but can be under different tensions (e.g., where the tension difference can be used to impart a predetermined layer size or stretching).

Curing the adhesive S400 functions to cure the adhesive to ensure that the layers are secured together. Curing the adhesive can include: evaporating solvent from the adhesive, inducing a phase change in the adhesive, and/or any suitable curing steps. S400 is preferably performed before processing the layers, but can be performed at the same time as and/or after processing the layers. S400 is preferably performed by a curing mechanism, but can be performed by any suitable component and/or system. S400 can cure an area, a line, and/or a point of the layer (e.g., sequentially, simultaneously, etc.).

S400 preferably includes curing the adhesive for at least a curing time. The curing time can depend on the adhesive (e.g., composition), the thickness of the adhesive, the layers, the curing mechanism (e.g., temperature, pressure, etc.), the throughput rate, be constant, and/or can be any suitable amount of time and/or depend on any suitable property. In a specific example, the curing time can be at least the drying time of the adhesive (e.g., ≥10 s, ≥20 s, ≥30 s, ≥1 min, ≥2 min, ≥5 min, ≥10 min, ≥20 min, etc.). However, the curing time can be unrelated to and/or less than the drying time of the adhesive (e.g., an amount of time required to dry a predetermined amount, fraction, quantity, proportion, etc. of the adhesive). However, additionally or alternatively, the adhesive can approximately instantly cure (e.g., once layers contact, the adhesive cures; once the adhesive achieves a predetermined temperature, the adhesive cures; adhesive cures within less than about 10 s; etc.), can continually cure (e.g., even after the curing mechanism has been applied the adhesive can continue to set and cure indefinitely; over a period of minutes, hours, days, weeks, months, etc.; etc.), and/or can otherwise cure.

S400 can include: heating the layer, applying pressure to the layer, chemically treating the adhesive, applying radiation to the layer, and/or any suitable curing steps.

Heating the layer preferably functions to raise the temperature of the adhesive (and layers) to a predetermined temperature. The predetermined temperature can be chosen to promote evaporation of the solvent from the adhesive, to promote a phase change of the adhesive, and/or chosen to achieve any target function. The predetermined temperature is preferably at most a boiling point (e.g., boiling temperature) of the adhesive or solvent, but can additionally or alternatively be greater than the boiling point of the adhesive or solvent, a target temperature, a threshold temperature, and/or any suitable temperature. The heat to raise the temperature of the adhesive and/or layers can be applied conductively, convectively, and/or radiatively. In an illustrative example, the adhesive can be heated to a temperature between about 50-95° C. (such as 60° C., 65° C., 70° C., 75° C., 80° C., 85° C., 90° C., etc.). However, the adhesive (and/or layers) can be heated to any suitable temperature. Generally, both the adhesive and layers will be heated to the predetermined temperature (e.g., same temperature). However, in some variants, only the adhesive or only the layer(s) may be heated (e.g., directly heated such as by using a heat source that selectively heats one component where heat from that component can then transfer to the remaining components).

Applying pressure (or force) to the layer preferably functions to apply pressure to hold the layers together. The pressure can be applied normal to a broad face of the layers, at an angle to the face of the layer, normal to an edge of the layer, radially relative to the layer, tangentially to the layer, and/or in any suitable direction. The amount of pressure is preferably below a snagging and/or tearing pressure, but can be greater than or unrelated to a snagging or tearing pressure. In a specific example, the amount of force applied to the layer can be <100 kN, <10 kN, <1 kN, <100 N, <10 N, etc.). However, any suitable amount of force and/or pressure can be applied.

In some embodiments, S400 can include curing the adhesive using a plurality of curing methods. The curing methods can be applied simultaneously or concurrently, contemporaneously, sequentially, delayed, and/or applied with any suitable timing (e.g., for a given location of the layers). Each curing method can be associated with the same or a different curing mechanism. Each curing method can cure a predetermined portion (e.g., quantity, fraction, proportion, etc.) of the adhesive. The predetermined portion can be the same or different for each curing method. The predetermined portion can refer to: an amount of solvent removed, a fraction of the total (expected) retention force generated, and/or any suitable quality of the adhesive. In a first illustrative example, a first curing method can cure approximately 50% (e.g., 40-60%) of the adhesive and a second curing method can cure approximately 50% of the adhesive (e.g., 40-60%). In a second illustrative example a first curing method can cure approximately 20% (e.g., 10-30%) and a second curing method can cure approximately 80% (e.g., 70-90%) of the adhesive. However, each curing method can cure any proportion of the adhesive.

Figure 6A:
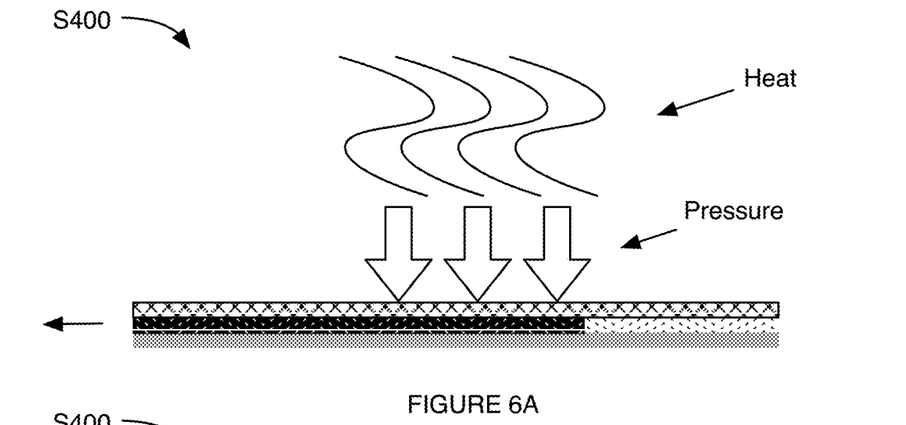
FIGS. 6A-6C are schematic representations of examples of curing an adhesive, including concurrently heating and pressing the assembly; pressing then heating the assembly; and heating then pressing the assembly, respectively.
Figure 6B:
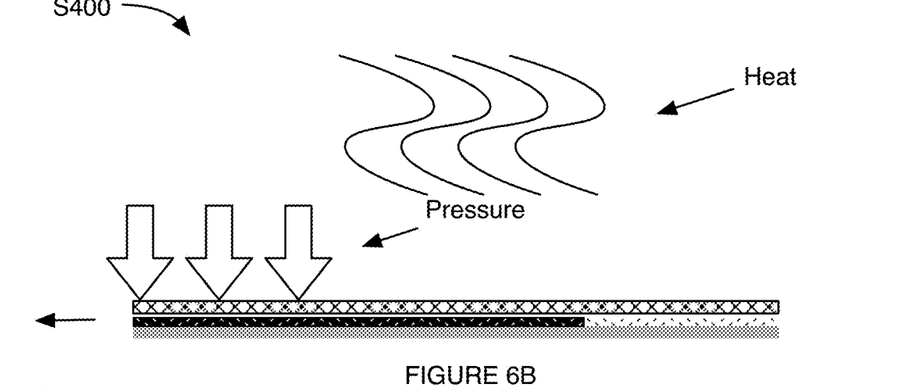
Figure 6C:
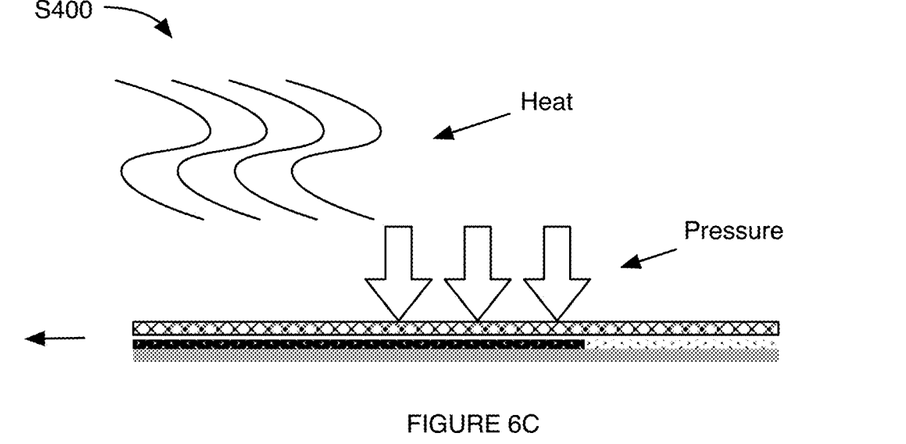

In a first specific example as shown in FIGS. 6A-6C, S400 can include heating and applying pressure to the layer. The heat and pressure can be applied simultaneously, heat can be applied before pressure, pressure can be applied before heat, heat and pressure can be applied iteratively (e.g., with the same or different temperature and/or pressure at each iteration), and/or in any suitable order. The heat and/or pressure can be applied locally (e.g., to a specific location of the layer, selectively to the adhesive and/or a single layer, etc.) and/or globally (e.g., to the layer as a whole). In a first variation of this example, the pressure and heat can be applied by the same component (e.g., a heated plate, pair or set of heated plates, a heated perforated plate, heated and pressurized air, etc.). In a second variation of this specific example, the pressure and heat can be applied cooperatively between two sets of plates (e.g., perforated plates, parallel plates, non-parallel plates, convex plates, concave plates, etc.) where the plates can be heated to the same and/or different temperatures. In a third variation of this specific example, the pressure and heat can be applied by a roller (e.g., a heated roller) in contact with the layers. However, the heat and/or pressure can be applied by any suitable component.

In a second specific example, as shown in FIG. 9A, S400 can include curing the adhesive using a curing environment and by blowing gas through (or over) the layers. The curing environment can be heated to a predetermined temperature (such as the curing temperature), can have a predetermined curing environment (e.g., a target humidity, a target air flow, etc.), and/or can otherwise be configured to cure the adhesive. The provided gas can include air, inert gases (e.g., helium, neon, argon, krypton, xenon, carbon dioxide, etc.), reactive gases (e.g., oxygen, sulfur, fluorine, chlorine, bromine, iodine, hydrogen, boranes, phosphanes, nitrogen oxides, sulfur oxides, etc.), and/or any suitable gases. The gas is preferably dry (e.g., has a water content less than about 40%), but can wet (e.g., have a water content greater than about 40%) and/or include any suitable water content. The gas is preferably provided in a line, where the length of the line substantially matches the lateral extent of the layers. However, the gas can be provided over an area, to a point (e.g., raster scan a narrow stream of gas), to a line with length greater than or less than the lateral extent of the layers, and/or otherwise be provided. The gas is preferably provided normal to a broad face of the layers, but can intersect and/or be provided parallel to the broad face of the layers. The gas velocity (e.g., impact velocity) can be any value or range of values between about 10 miles per hour (mph) to 40,000 mph, less than 10 mph, greater than 40,000 mph and/or any suitable value.

In a third specific example as shown in FIG. 9B, S400 can include applying heat and/or pressure using plates (e.g., perforated plates, curved plates, perforated curved plates, etc.) and blowing gas through (or over) the layers.

However, S400 can include any suitable steps.

Processing the layers S500 can function to remove residual solvent from the adhesive, outgas any sorbed gases from the layers, shape the layers, wash excess adhesive from the layers, and/or any perform any suitable function. S500 can be performed at any suitable time before, during, and/or after S100-S400. S500 can be performed by a treatment mechanism, a shaping mechanism, and/or by any suitable mechanism.

In a first variant, S500 can include washing the layer. Washing the layer can function to remove excess adhesive (e.g., cured adhesive, uncured adhesive) from the layer. Washing the layer can include applying solvent (e.g., the same solvent and/or a different solvent from that used to dissolve the adhesive), agitating (e.g., scrubbing, abrading, ultrasonicating, etc.) the layers, and/or any suitable step(s).

In a second variant, S500 can include providing air (e.g., hot air such as with a temperature between 40-100° C.; dry air such as with a humidity ≤30%; etc.) through (or over) the layer. Drying the layer preferably functions to ensure that the adhesive is fully cured and/or to remove (e.g., displace, desorb, etc.) VOCs that may be in the layers and/or adhesive. Providing air can be performed, for example, by an air knife (e.g., blower). However, the layer can be dried in any suitable manner.

Figure 8:
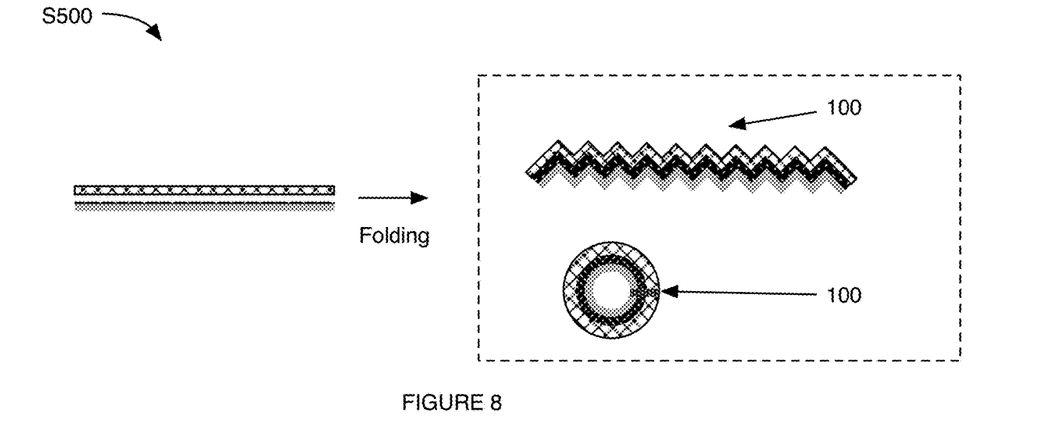
FIG. 8 is a schematic representation of an example of shaping filter media.

In a third variant, as shown for example in FIG. 8, S500 can include manipulating the layer. Manipulating the layer can function to define the shape of the layer (e.g., final shape, target shape, form factor, etc.). In a specific example, folding the layer can generate pleats and/or a cylindrical shape in the layer. In a variation of this example, adhesive (e.g., the same or different adhesive used to couple the layers) can be used to maintain the shape (e.g., by applying and curing the adhesive to the layer). However, manipulating the layer can include cutting the layer, pressing the layer, and/or any suitable steps to generate any suitable layer shape.

5. Illustrative Example

In an illustrative example, a method for laminating a filter (e.g., a multilayer filter) can include providing a first filter layer (e.g., a mechanical filter such as a fibrous filter medium or substrate coated with photocatalytic material on a surface of the substrate; a support layer such as a metal mesh), applying adhesive to the filter layer (e.g., the surface with photocatalytic material, the surface without photocatalytic material, an edge of the layer, a surface of the support layer, etc.), providing a second filter layer (e.g., a support layer such as a conductive support layer, a photocatalytic layer, a sorptive layer, an electrostatic layer, etc.), optionally applying adhesive to the second filter layer (e.g., to the face that will be adhered to the first filter layer), contacting the filter layers (e.g., with adhesive between the surfaces and/or edges in contact), curing the adhesive, and shaping the filter (e.g., pleating the filter, rolling the filter into a cylinder, cutting the filter media to a predetermined size, etc.). The adhesive can be applied as an aqueous solution by rolling the adhesive onto the filter layer and/or by submerging or otherwise contacting the filter layer with the adhesive within the adhesive reservoir. The adhesive can include sodium silicate (e.g., an aqueous sodium silicate solution). Curing the adhesive can include simultaneously heating the layers and adhesive to a temperature (e.g., between 50-95° C.) and applying pressure across the filter (e.g., substantially normal to the face including adhesive). However, the method can include any suitable steps.

In a first illustrative example of a multilayer filter, the multilayer filter can include a photocatalytic layer (e.g., PECO layer) and a support layer laminated together using an inorganic adhesive (e.g., an adhesive consisting essentially of inorganic components). The photocatalytic layer can include a substrate and photocatalytic material disposed on the (fibrous) substrate. The photocatalytic material can be retained on (e.g., disposed on, coupled to, etc.) the substrate using a binder. The binder is preferably essentially inorganic (e.g., contains at most 1% organic material), but can additionally or alternatively include organic material, a mixture of organic and inorganic material, and/or can be any suitable material(s). The binder can, for instance, be the same material as the adhesive, a ceramic material, a metal oxide, a polymer, a glue, and/or any suitable material. The support layer can be a metal mesh. The inorganic adhesive can electrically couple the photocatalytic layer to the support layer.

In a second illustrative example of a multilayer filter, the multilayer filter can include a photocatalytic layer (e.g., PECO layer), a support layer, an electrostatic layer, and a sorptive layer. The sorptive layer and electrostatic layer can be fused together (e.g., melted together). The photocatalytic layer can be connected to the support layer using an inorganic adhesive and the support layer can be connected to the electrostatic layer using the inorganic adhesive. The sorptive layer can include a substrate (such as a scrim) with a sorptive material (e.g., activated carbon) disposed on the sorptive layer substrate. The electrostatic layer can include melt blown polymer fibers. However, any suitable filter layers can be used.

In a third illustrative example of a multilayer filter, the multilayer filter can include a photocatalytic layer (e.g., a PECO layer), an electrostatic layer, and a sorptive layer. The sorptive layer and electrostatic layer can be fused together (e.g., melted together) and the photocatalytic layer can be connected to the electrostatic layer or the sorptive layer using an inorganic adhesive.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A filter lamination apparatus for producing a filter media comprising a plurality of layers, the filter lamination apparatus comprising:
   an adhesive reservoir configured to store a volume of adhesive mixture;
   an adhesive applicator configured to apply the adhesive mixture to a first broad face of a first layer of the filter media;
   a blade positioned a predetermined distance from the first broad face of the first layer;
   a first set of plates arranged to contact a first broad face of the filter media during operation; and
   a second set of plates opposing the first set of plates across the filter media, wherein second set of plates is arranged to contact a second broad face of the filter media, wherein the first and second sets of plates are configured to apply a predetermined pressure to the filter media, wherein the first and second sets of plates are heated to a predetermined temperature during operation.

2. The apparatus of claim 1, wherein a tension on each layer of the filter media is at most a threshold value.

3. The apparatus of claim 1, wherein at least 75 linear feet of filter media is laminated per minute of operation.

4. The apparatus of claim 1, wherein the first set of plates comprises perforated plates.

5. The apparatus of claim 4, wherein the perforated plates are convex such that the filter media contacts an apex of the perforated plate.

6. The apparatus of claim 1, further comprising an air knife, wherein the air knife is arranged after the first and second sets of plates.

7. The apparatus of claim 6, wherein the first and second set of plates cure at most 60% of the adhesive mixture, wherein the air knife cures a remainder of the adhesive mixture.

8. The apparatus of claim 1, wherein the adhesive mixture comprises an inorganic adhesive and water.

9. The apparatus of claim 1, wherein the adhesive applicator is further configured to apply a second predetermined amount of the adhesive to a second broad face of the first layer of the filter media, wherein the second broad face is contacted to a broad face of a third layer.

* * * * *